United States Patent [19]

Yasuda et al.

[11] 4,413,256
[45] Nov. 1, 1983

[54] DRIVING METHOD FOR DISPLAY PANELS

[75] Inventors: Shuhei Yasuda; Katsubumi Koyanagi; Yutaka Ishii; Tomio Wada, all of Nara, Japan

[73] Assignee: Sharp Kabushiki Kaisha, Osaka, Japan

[21] Appl. No.: 236,582

[22] Filed: Feb. 20, 1981

[30] Foreign Application Priority Data

Feb. 21, 1980 [JP] Japan ............... 55-21129

[51] Int. Cl.³ .............................. G09G 3/36
[52] U.S. Cl. ............................ 340/784; 340/765; 340/805; 350/333
[58] Field of Search ............... 340/765, 784; 350/333

[56] References Cited

U.S. PATENT DOCUMENTS 3,809,458  5/1974  Heuner ................. 350/333
3,922,667 11/1975  Ueda et al. ........... 340/784 X
4,236,155 11/1980  Nagata ................ 340/765 X
4,241,339 12/1980  Ushiyama ............. 340/784 X Primary Examiner—David L. Trafton
Attorney, Agent, or Firm—Birch, Stewart, Kolasch & Birch

[57] ABSTRACT

A display device includes a combined dynamic scattering mode and twisted nematic mode cell structure including at least one first display electrode oriented in a first direction and a plurality of second display electrodes in a second direction. The plurality of second display electrodes oriented are supplied with a plurality of scanning signals of sequentially shifted phases with polarity inverted at a predetermined interval of time, whereas the first electrode is supplied with frame signals indicative of information to be displayed and having polarity inverted at the predetermined interval. In order to minimize variations in the threshold level of the display device, a plurality of pulse signals having a pulse width shorter than the pulse width of said scanning signals are added to the frame signals.

2 Claims, 27 Drawing Figures

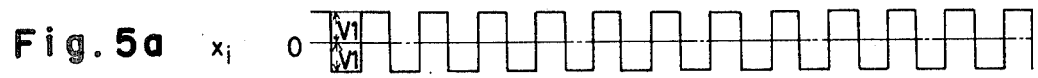
Fig. 5a $x_i$
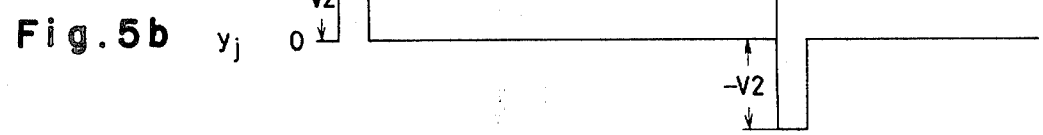
Fig. 5b $y_j$
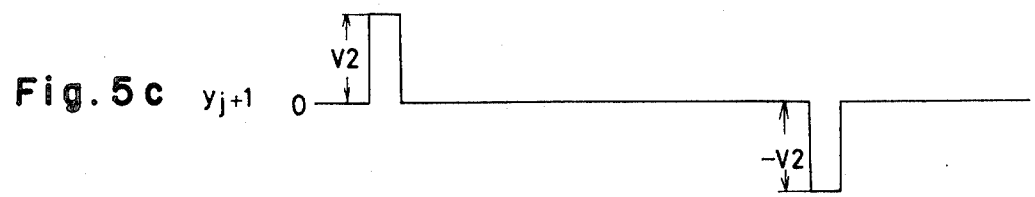
Fig. 5c $y_{j+1}$
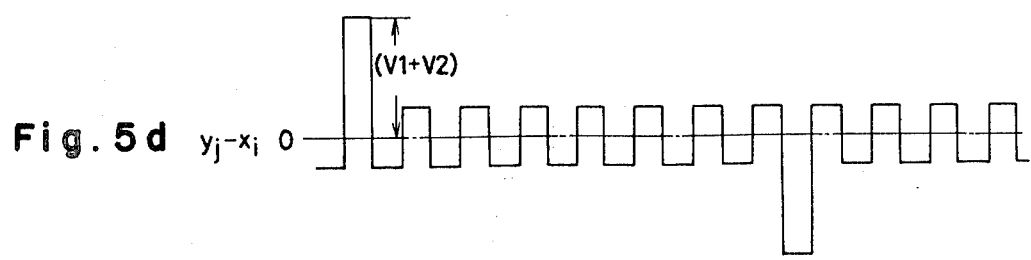
Fig. 5d $y_j - x_i$
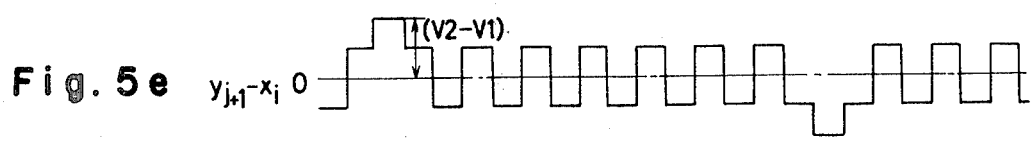
Fig. 5e $y_{j+1} - x_i$

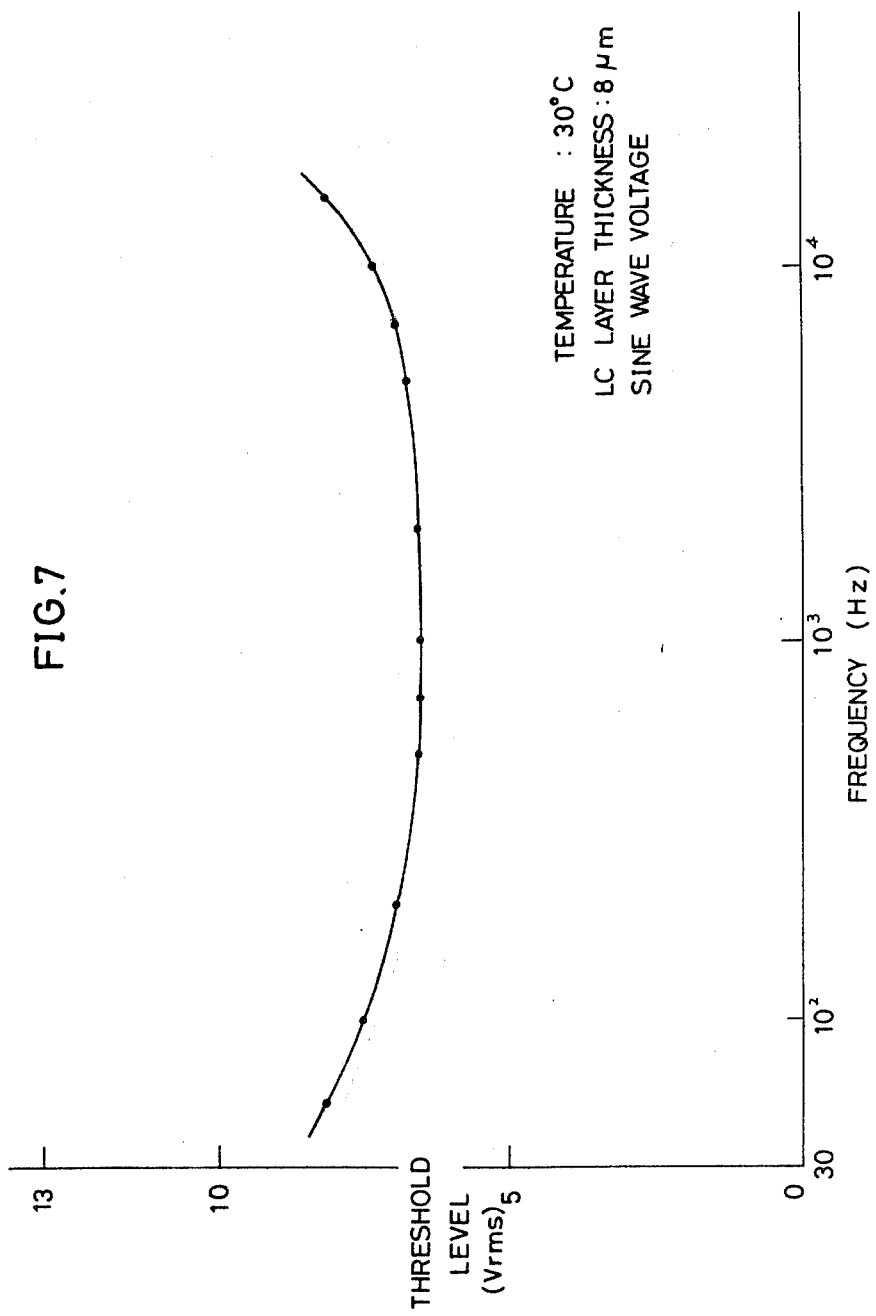

DRIVING METHOD FOR DISPLAY PANELS

BACKGROUND OF THE INVENTION

This invention relates to a driving technique for driving panels and more particularly to a method for driving a liquid crystal display panel of the DTN type that is, combined DS (dynamic scattering mode) and TN (twisted nematic mode) type, which has a twisted alignment at 90° with respect to a polarizer and a detector for the purpose of displaying various moving pictures including characters and symbols, for example.

When it is desirable to display moving pictures such as TV pictures by means of a matrix configuration liquid crystal display panel, it is necessary to provide half tone. In the case where those pictures are to be displayed on the matrix liquid crystal panel by the well known pulse width modulation technique, frequency components of voltage waveforms developing on the panel include higher frequency components. On the other hand, for a whole black level display (OFF state) or a whole white level display (ON state), low frequency components are significant. Therefore, in displaying the moving pictures, more particularly ones including a number of black level pixels or white level pixels on the liquid crystal panel, the low frequency components are increased with the result in deterioration in image quality on the liquid crystal panel.

OBJECTS AND SUMMARY OF THE INVENTION

Accordingly, it is an object of the present invention to provide a method for driving a display panel which minimizes variations in threshold level due to low frequency component, avoids inferior molecular alignment and extends the operating life of the display panel.

In accordance with a preferred aspect of the present invention, a display device comprises a dynamic scattering mode liquid crystal structure including at least one first display electrode in a first direction and a plurality of second display electrodes in a second direction, means for supplying said plurality of second display electrodes with a plurality of scanning signals of sequentially shifted phases with polarity inverted in a predetermined interval of time, means for supplying said first display electrode with frame signals indicative of information to be displayed and having polarity inverted in said predetermined interval, wherein a plurality of pulse signals having a pulse width shorter than the pulse width of said scanning signals are added to said frame signals.

BREIF DESCRIPTION OF THE DRAWINGS

For a more complete understanding of the present invention and for further objects and advantages thereof, reference is now made to the following description taken in conjunction with the accompanying drawings, in which:

FIG. 1 is an illustration of a DS liquid crystal cell;

FIG. 2 diagrammatically illustrates a DTN cell structure incorporating the DS cell of FIG. 1;

Figure 8:
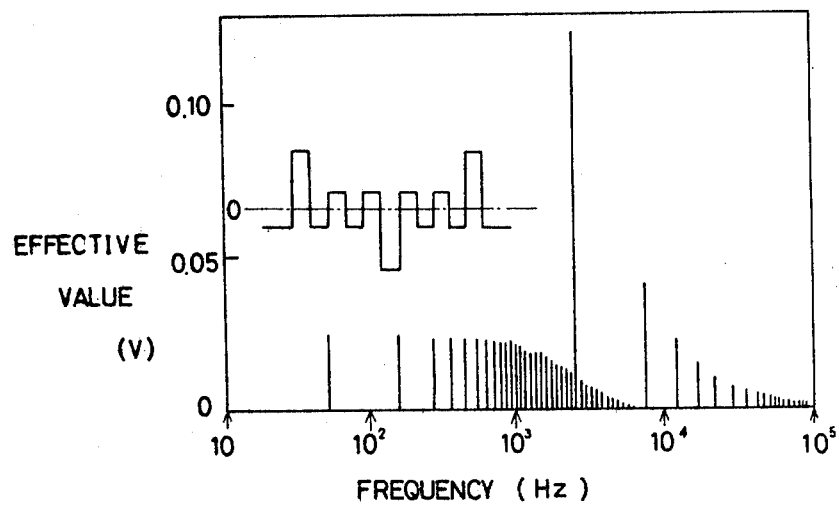
Figure 8:
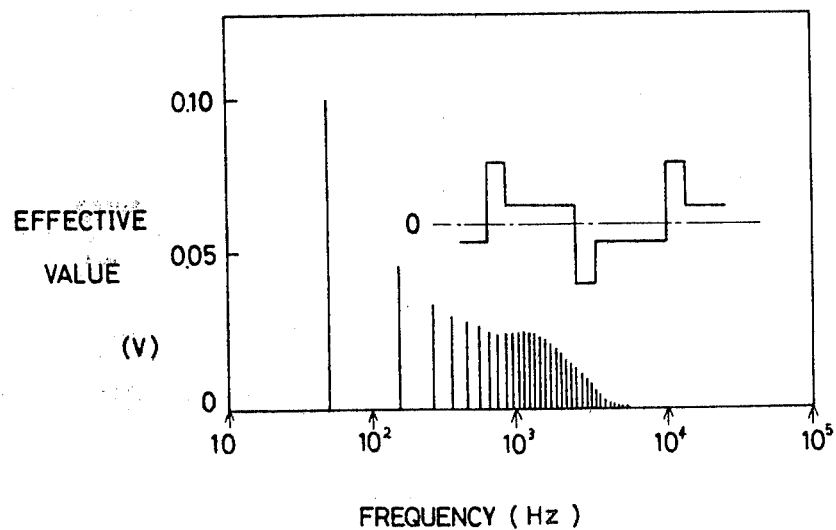
Figure 9:
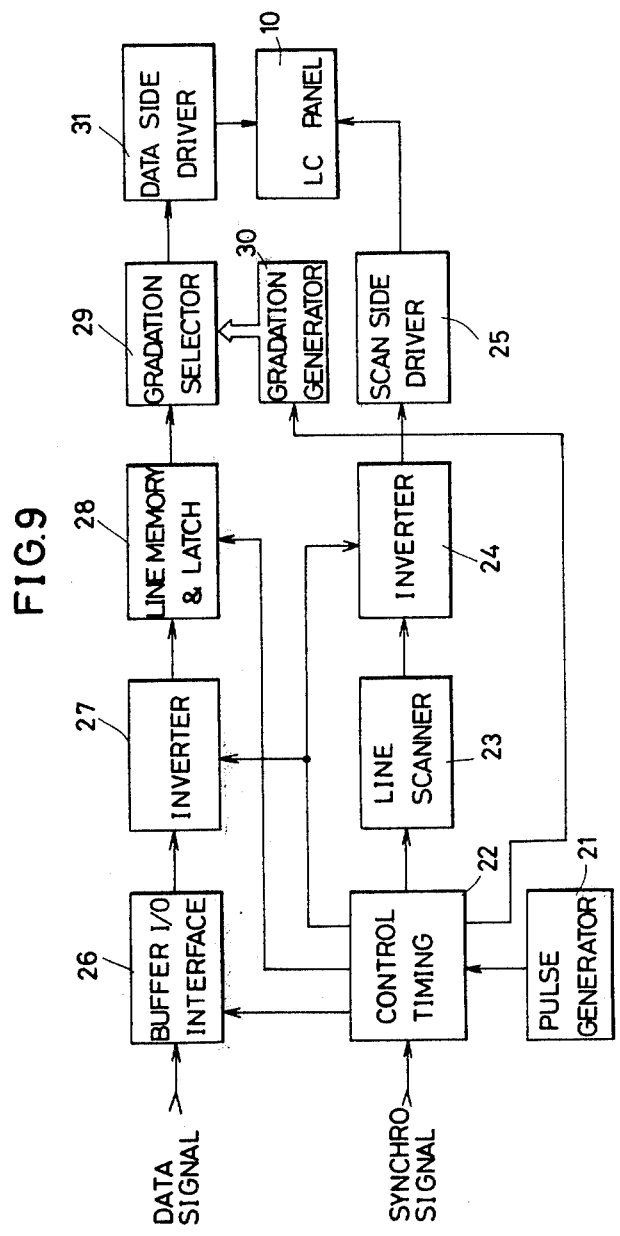

FIGS. 5(a) to 5(e) are waveform diagrams of voltages applied to column and row electrodes and a particular one of pixels on the matrix type liquid crystal display panel;

FIGS. 6(a) to 6(h) are voltage waveform diagrams when all of the pixels on the panel are enabled or disabled;

FIG. 7 is a graph showing the threshold level-frequency properties of the DTN cell structure;

FIGS. 8(a) and 8(b) are frequency spectra of voltage waveforms on the matrix display panel;

FIG. 9 is a schematic block diagram of an embodiment of the present invention; and FIGS. 10(a) to 10(f) are waveform diagrams of voltages appearing in the emobodiment of FIG. 9.

DETAILED DESCRIPTION OF THE INVENTION

Figure 1:
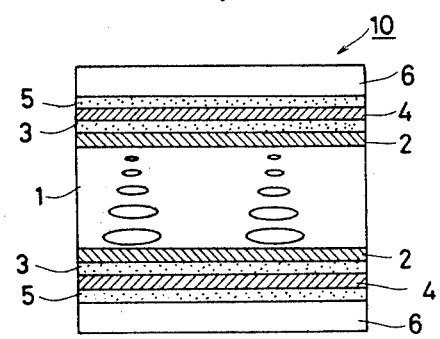

FIG. 1 is an illustration of a DS liquid crystal cell which is of interest to the present invention. The liquid crystal cell 1 is adapted such that the logituninal axes of molecules on its upper and lower surfaces are pependicular to each other due to 90° twisted alignment (homogeneous alignment). The upper and lower surfaces of the liquid crystal cell 1 are covered with surfactants 2 which each overlying a layer 3 of $SiO_2$ and a transparent, electrically conductive layer 4. Furthermore, a layer 5 of $SiO_2$ and a glass sheet 6 are disposed on each of the transparent and conductive layers 4. The first $SiO_2$ layer 3 is to ensure uniform affinity between the transparent and conductive layers 4 and the surfactants 2, while the second $SiO_2$ layer 5 is to ensure uniform surface of the glass sheets 6. An example of conditions of manufacturing the DS cell as shown in FIG. 1 is depicted in Table 1.

TABLE 1

| Liquid crystal material | Predominant liquid crystal material |
| --- | --- |
| | p-methoxybenzylidene-p'-n-butylaniline 45 wt % |
| | p-ethoxybenzylidene-p'-n-butylaniline 45 wt % |
| | Additional liquid crystal material |
| | 1-cyano-1-(p-ethoxyphenyl)-2-(p-hexyphenyl)ethylene[1] 9.82% |
| | cholesteryl nonanoate[2] |
| Ionic additive | tetrabutylammonium-3-5-dinitrobenzoate 0.75 wt % with respect to liquid crystal |
| Alignment agent | SH 6040 (by Torei Silicone) $CH_2CHCH_2OCH_2CH_2Si(OCH_3)_3$ 1 wt % |

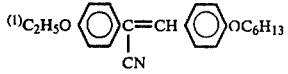

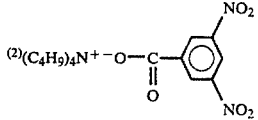

Figure 2:
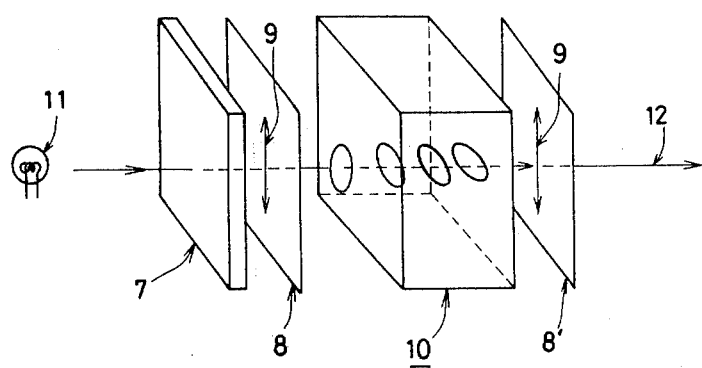

FIG. 2 diagrammtically illustrates a typical example of a DTN cell structure incorporating the DS type cell of FIG. 1. One major surface of a DS cell is flanked with a polarizer 8 and a scattering plate 7 and another major surface with a detector 8'. The polarization direction of the polarizer 8 and the detector 8' is shown by the arrow. When light from a light source 11 is incident on the DTN cell after being scattered by the scattering plate 7, output light 12 is imaged as a function of brightness due to the property of canceling polarization light by the DS cell structure 10. In the situation shown in FIG. 2, the incident light is modified into linearly polarized light through the polarizer 8 and then twisted by 90° through the DS cell structure 10 having a 90° twisted alignment so that light is shut off and no output light 12 is obtainable since the alignment direction of the output side of the DS cell is normal to the polarization direction 9 of the detector 8'. In other words, the cell is in the OFF state.

When a certain voltage is applied to the transparent and conductive layer 4 of the DS cell 10, polarized light components passing through polarizer 8 along the polarization direction 9 are not subject to 90° rotation in traversing the DS cell 10 so that the output light 12 is obtainable through the detector 8'. In other words, the cell is in the ON state.

Figure 3:
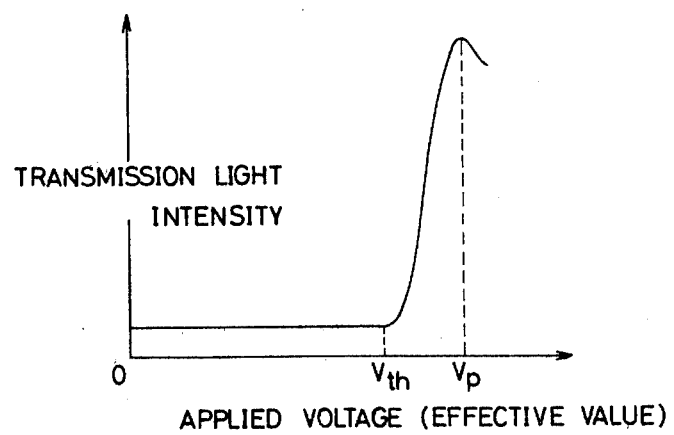
FIG. 3 is a graph showing the voltage-transmission light intensity properties of the DTN cell.

FIG. 3 shows a typical example of the voltage-transmission light intensity properties of the DTN cell structure of FIG. 2. In FIG. 3, the threshold voltage level is designated $V_{th}$ and the voltage at which the maximum intensity of transmission light is insured is designated $V_p$. If the applied voltage is lower than the threshold level, then the DTN cell structure is in the OFF state and no light is transmitted. If the applied voltage varies within the range covering from the threshold level $V_{th}$ to the maximum voltage $V_p$, a half tone image is provided. Furthermore, when the applied voltage is $V_p$, the cell structure is placed into the ON state with a white level.

Figure 4:
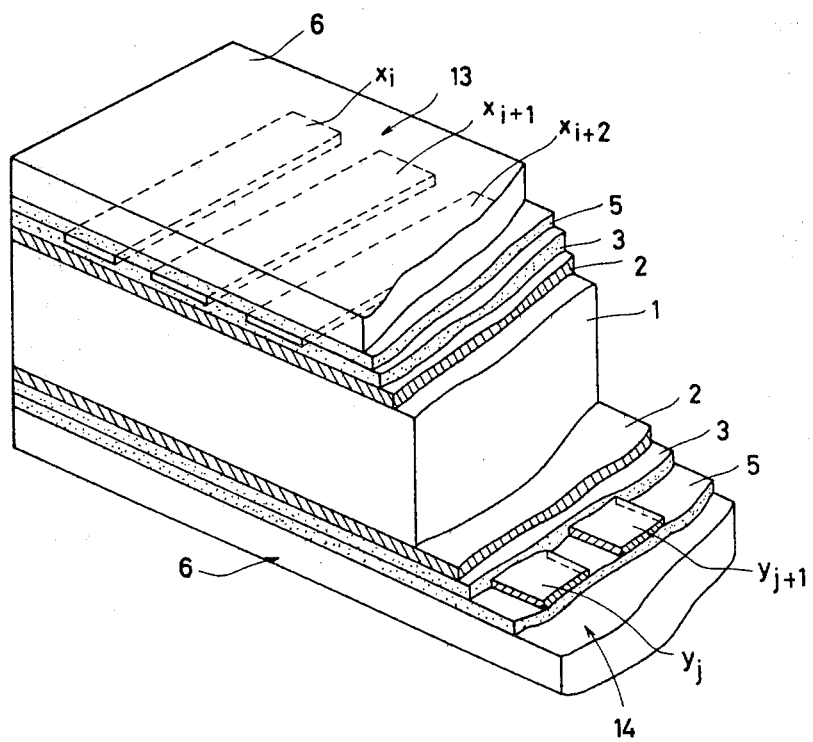
FIG. 4 is a perspective view partially in cross section of a matrix type liquid crystal display panel using the DTN cell structure.

A matrix configuration liquid crystal display panel incorporating the DTN cell structure is typically shown in a partically cut-away perspective view of FIG. 4. The matrix panel of FIG. 4 includes a plurality of column electrodes 13 oriented in a first direction as one of the transparent and conductive layers 4 of the DS cell 10 of FIG. 1 and a plurality of row electrodes 14 oriented in a second direction as the other transparent conductive layer 4. Each of the crossings of the column electrodes 13 and the row electrodes 14 forms a respective pixel.

FIGS. 5(a) to 5(e) depict the waveform of a voltage applied to a particular column electrode 13 of the matrix panel of FIG. 4, the waveform of a voltage applied to a particular row electrode 14 and the waveform of a voltage applied to the crossing thereof. Modulating the brightness of the pixels of the matrix panel of FIG. 4 is achieved by varying the effective voltages on the pixels according to the information to be displayed. By way of example, the matrix panel is driven by line-sequential scanning with a 1/15 duty ratio. FIG. 5(a) shows a train of voltage pulses applied to the particular one $x_i$ of the column electrodes 13 to provide half tone, the voltage pulses being alternating pulses with a fixed amplitude $V_1$. FIGS. 5(b) and 5(c) show scanning pulses applied to particular ones $y_j$ and $y_{j+1}$ of the row electrodes 14, which pulses are alternating pulses with an amplitude $V_2$. FIGS. 5(d) and 5(e) show the waveforms of the voltages applied across the pixels $(y_j - x_i)$ and $(y_{j+1} - x_i)$ of the liquid crystal panel. In this case the pixel $(y_j - x_i)$ is enabled with half tone and the pixel $(y_{j+1} - x_i)$ is disabled.

Figure 6A:
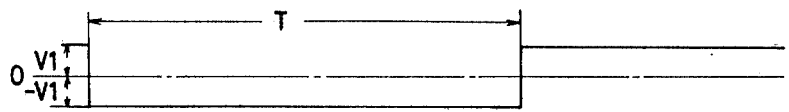
Figure 6B:
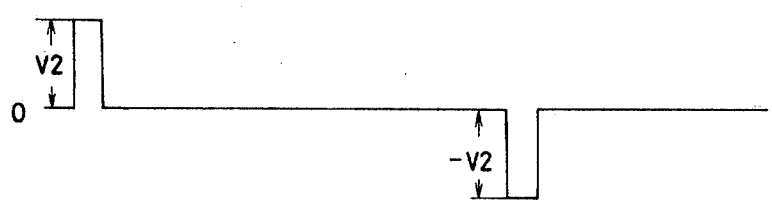
Figure 6C:
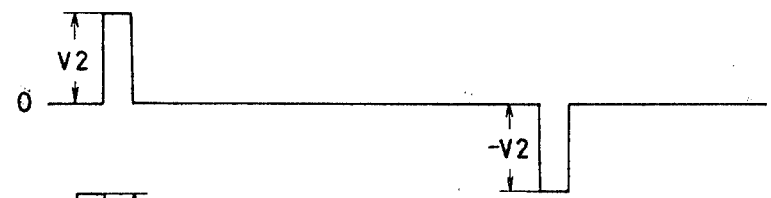
Figure 6D:
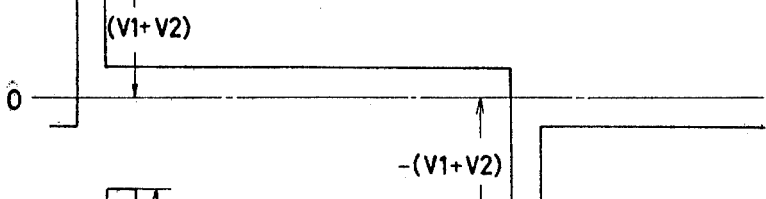
Figure 6E:
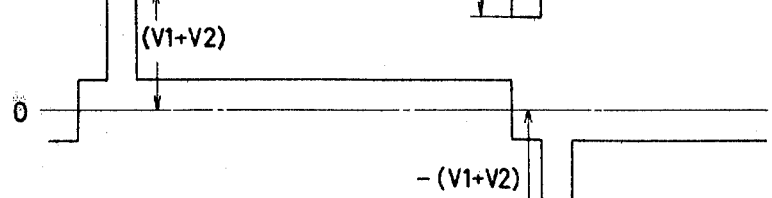
Figure 6F:
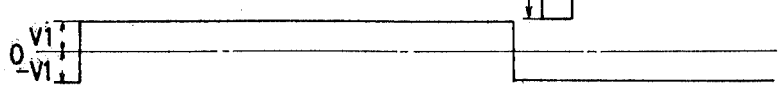
Figure 6G:
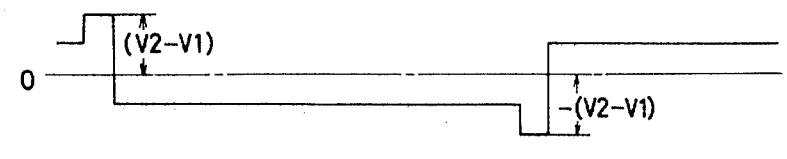
Figure 6H:
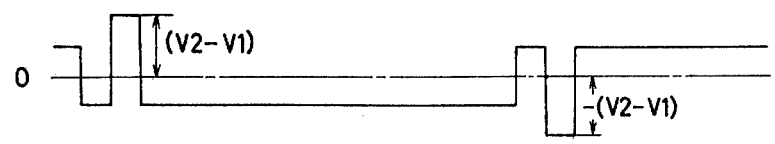

FIGS. 6(a) to 6(h) show the waveforms of applied voltages to the matrix panel when all of the pixels are enabled or disabled. More particularly, FIG. 6(a) the waveform of a voltage signal applied to all of the column electrodes 13 when they are to be enabled. This voltage signal is inverted in polarity after a predetermined interval T so that the display panel is supplied with an alternating voltage. FIGS. 6(b) and 6(c) are the voltage waveforms showing the scanning pulses applied to the row electrodes $y_j$ and $y_{j+1}$, indicating that the display panel is supplied with an alternating voltage with polarity inverted in timed relationship with the signal waveform of FIG. 6(a). FIGS. 6(d) and 6(e) show the waveforms of voltages developing across the pixels $(y_j - x_i)$ and $(y_{j+1} - x_i)$, indicating that all of the pixels are enabled (ON). FIG. 6(f) shows the waveform of a voltage signal applied to all of the column electrodes 13, wherein all of the pixels are disabled (OFF). This voltage signal is inverted in polarity after the predetermined interval T as in FIG. 6(a), thus supplying the liquid crystal panel with an alternating pulse. In FIGS. 6(g) and 6(h), there is shown the waveform of voltages developing across the pixels $(y_j - x_i)$ and $(y_{j+1} - x_i)$ when the signal voltage as shown in FIG. 6(f) is applied. In this case the pixels are all disabled. Comparison of the voltage waveforms applied to the pixels as shown in FIGS. 5(d) and 5(e) and FIGS. 6(d), 6(e), 6(g) and 6(h) reveals that the former includes higher frequency components than that of the latter. Especially, the latter includes components of the basic interval 2 T and the liquid crystal panel is supplied many low frequency components with an interval T.

FIG. 7 is an example of the threshold voltage-frequency characteristics of the DTN cell structure. It is clear from FIG. 7 that the thresold voltage level of the DTN cell structure is somewhat higher within a low frequency range and a high frequency range. Variations in the threshold level result in variations in the effective voltage value $V_{rms}$ (OFF) of the liquid crystal display panel in the OFF state, thus deteriorating image quality and especially flicker effect on the display screen. Furthermore, the liquid crystal itself deteriorates when a voltage of a low frequency range is applied.

FIGS. 8(a) and 8(b) depict frequency spectra when a voltage is applied to the display panel. More particularly, FIG. 8(a) depicts when the voltage waveform of FIG. 5(d) is applied to the panel and FIG. 8(b) depicts when the voltage waveform of FIG. 6(d) is applied. The former shows higher intensities of the high frequency components and the latter shows higher intensities of the low frequency components.

As stated previously, a purpose of the present invention is to provide a driving technique for a display panel by which the variations in the threshold voltage level are minimized by adding a plurality of pulse signals or high frequency components to the frame signals with polarity inverting at predetermined intervals when the panel is activated at a white level or a black level. FIG. 9 is a schematic block diagram showing a preferred embodiment of the present invention and FIG. 10 is a waveform diagram showing various voltage signals in the circuit of FIG. 9. Data signals are typically intelligence signals introduced via a keyboard or TV picture signals and are supplied to a buffer I/O interface 26. Furthermore, keyboard strobe signals or external synchronizing signals such as TV horizontal synchronizing signals and vertical synchronizing signals are supplied to a control timing circuit 22 in association with the data signals. The control timing circuit 22 is also supplied with pulse signals of a relatively short pulse width $\tau$ from a pulse signal generator 21. The control timing circuit 22 brings this pulse into synchronism with the external synchronizing signals. The synchronized pulse signals are furnished to a line-sequential scanning circuit 23, an inverter 24, the buffer I/O interface 26, an inverter 27, a line memory and latch 28 and a gradation pulse generator 30. The line-sequential scanning circuit 23 typically includes a counter and a decoder, with the former counting the pulse signals and the latter decoding the count of the counter and helping generating scanning signals having sequentially shifted phases as seen from FIGS. 10(b) and 10(c). The scanning signals are fed to the inverter 24 which in turn inverts the polarity of the scanning signals at the predetermined interval T. The resultant scanning signals from the inverter 24 are supplied to, for example, the row electrodes of the liquid crystal display panel via a scanning driver 25.

Figure 10A:
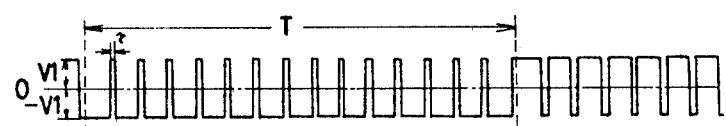

The buffer I/O interface 26 adds pulses of a pulse width $\tau$ as shown in FIG. 10(a) to the data signals as well as bringing the data signals into synchronism with the pulse signals from the control timing circuit 22. The data signals with the pulse signals added thereto are then fed to the inverter 27 which in turn inverts the pulse signals added to the data signals at the predetermined interval T whenever counting a given number of the pulse signals, for example. The output of the inverter 27 is then supplied to the line memory and latch circuit 28 wherein it is temporarily stored and fetched immediately in response to the pulse signals from the control timing circuit 22. The fetched data signals are supplied to a gradation pulse selector 29 which is supplied with a plurality of gradation pulses from the gradation pulse generator 30. These gradation pulses are ones which are to be interposed within the interval T. To provide the black level, one of the gradation pulses is a pulse signal which is equal in its effective value to the threshold voltage level and typically assumes a logic "0" level for a limited period of time. In addition, to provide the white level, another one of the gradation pulses is a pulse signal which is equal in its effective value to the maximum voltage $V_p$ and typically assumes a logic "1" level for a limited period of time. The effective voltage values of the remaining gradation pulse signals are somewhere between the threshold voltage $V_{th}$ and the maximum voltage $V_p$ and assume either the logic "1" level or the logic "0" level for a limited period of time in order to provide a half tone display.

The gradation pulse selector 29 selects gradation pulses, depending on the data signals supplied from the line memory and latch circuit 28. In other words, the logic "0" level signal is selected for the limited period of time when to display the black level and the logic "1" level signal is selected when to display the white level. Moreover, corresponding gradation pulses are selected to provide a desired half tone display. Accordingly, in displaying the white level, the frame signal with the pulse signal having the logic "1" level during the first pulse width T and the interval $\tau$ is applied to the panel. Particularly, this frame signal is supplied to the column electrodes of the panel via a data side driver 31.

Figure 10B:
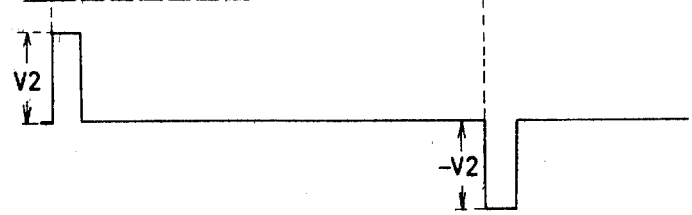
Figure 10C:
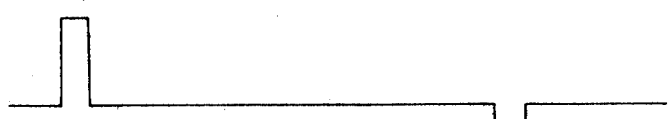
Figure 10D:
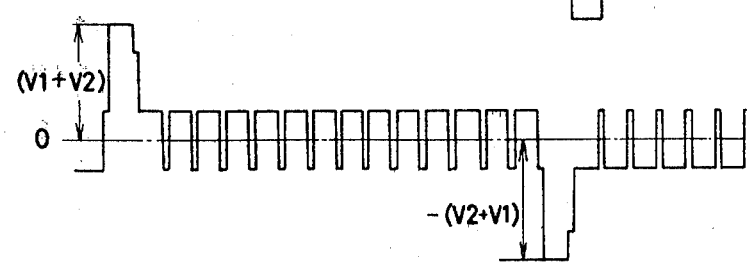
Figure 10E:
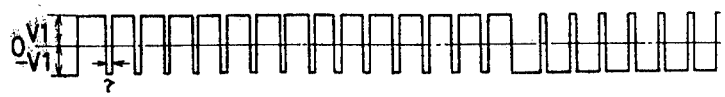
Figure 10F:
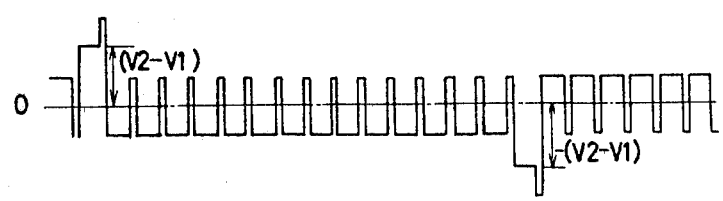

Since the plurality of the pulse signals are interposed within the frame signals even when displaying the white level, it is possible to minimize the low frequency components and make the effective voltage values substantially constant. As a result, the threshold level of the panel is made fixed to insure stable display. The waveform of FIG. 10(d) represents the voltages applied between the column electrodes and the row electrodes when the panel is in the enabled state (or the white level), the waveform shown in FIG. 10(e) represents the data signals when the panel is in the disabled state and the waveform of FIG. 10(f) represents the voltages applied between the column electrodes and the row electrodes of the panel when the panel is in the disabled state (or the black level).

The pulse width $\tau$ of the pulse signals to be added to the data signals is selected such that the pulse signals do not assume any intermediate level between the black level and the white level. For example, assuming that the pulse width of the scanning signals as shown in FIGS. 10(b) and 10(c) is selected in the order of 130 $\mu$sec, the pulse width of the pulse signals added to the data signals is to be in the order of 20 $\mu$sec.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A display device comprising:
   a dynamic scattering mode liquid crystal structure including at least one first display electrode oriented in a first direction and a plurality of second display electrodes oriented in a second direction;
   means for supplying said plurality of second display electrodes with a plurality of scanning signals of sequentially shifted phases with polarity inverted at a predetermined interval of time;
   means for supplying said first display electrode with frame signals indicative of information to be displayed and having polarity inverted at said predetermined interval; and
   means for adding a plurality of pulse signals having a pulse width shorter than the pulse width of said scanning signals to said frame signals.

2. A display device as set forth in claim 1 wherein said dynamic scattering cell structure further comprises a polarizer and a detector with 90° twisted alignment, thus forming a combined dynamic scattering mode and twisted nematic mode or DTN structure.

* * * * *